(12) United States Patent
Bishop et al.

(10) Patent No.: US 8,585,793 B2
(45) Date of Patent: Nov. 19, 2013

(54) LOW FIBER RECIRCULATION FILTER

(75) Inventors: Timothy D. Bishop, Oxford, PA (US); Anthony P. LoCurcio, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 210 days.

(21) Appl. No.: 12/892,413

(22) Filed: Sep. 28, 2010

(65) Prior Publication Data

US 2012/0073253 A1    Mar. 29, 2012

(51) Int. Cl.
*B01D 46/00*    (2006.01)

(52) U.S. Cl.
USPC ............................................. 55/486; 55/524

(58) Field of Classification Search
USPC .................... 55/486, 487, 524, 528
See application file for complete search history.

(56) References Cited

U.S. PATENT DOCUMENTS

| | | | |
|---|---|---|---|
| 5,244,482 A * | 9/1993 | Hassenboehler et al. ........ | 55/528 |
| 5,538,545 A * | 7/1996 | Dauber et al. ................... | 96/153 |
| 5,997,618 A * | 12/1999 | Schneider et al. .............. | 96/135 |
| 6,077,335 A * | 6/2000 | Schneider et al. .............. | 96/135 |
| 7,306,659 B2 * | 12/2007 | Gorton et al. ................... | 96/134 |
| 7,594,946 B2 * | 9/2009 | Goto et al. ....................... | 55/485 |
| 7,727,297 B2 * | 6/2010 | Dauber et al. ............... | 55/385.6 |
| 2003/0054125 A1 | 3/2003 | Singer et al. | |
| 2006/0240213 A1 * | 10/2006 | Busch et al. ................. | 428/64.4 |
| 2007/0157588 A1 * | 7/2007 | Dauber et al. ............... | 55/385.6 |
| 2007/0283809 A1 | 12/2007 | Boulay et al. | |
| 2008/0120954 A1 * | 5/2008 | Duello et al. ................... | 55/528 |
| 2009/0183475 A1 * | 7/2009 | Dauber et al. ............... | 55/385.6 |

FOREIGN PATENT DOCUMENTS

WO    WO 2008/112250    9/2008

OTHER PUBLICATIONS

Search Report from PCT/US2011/053575 (8 pages).

* cited by examiner

*Primary Examiner* — Duane Smith
*Assistant Examiner* — Phillip Shao
(74) *Attorney, Agent, or Firm* — Amy L. Miller

(57) ABSTRACT

An improved disk drive recirculation filter is provided. The filter comprises a fibrous layer disposed between two polymeric scrim or support layers. The scrim layers have a bond through their thickness, the bond forming a plurality of closed cells, such that the span on the unbonded area between the bonds is less than a critical fiber length dimension desired to be contained.

14 Claims, 6 Drawing Sheets

LOW FIBER RECIRCULATION FILTER

BACKGROUND OF THE INVENTION

Many enclosures that contain sensitive instrumentation must maintain very clean environments in order for the equipment to operate properly. Examples include enclosures with sensitive optical surfaces or electronic connections that are sensitive to particles and gaseous contaminants which can interfere with mechanical, optical, or electrical operation, data recording devices such as computer hard disk drives, enclosures for processing, transporting or storing thin films and semiconductor wafers, electronic control boxes such as those used in automobiles and industrial applications. Contamination in such enclosures originates from both inside and outside the enclosures. For example, in computer hard drives, damage may result from external contaminants as well as from particles generated from internal sources. The terms "protective enclosures" will be used herein for convenience and are understood to include any of the enclosures mentioned above.

To address particulate contamination, internal particulate filters, or recirculation filters, may be installed in protective enclosures. These filters typically comprise an inner layer of electret media disposed between two or more outer scrim layers. Electret media is generally comprised of fibrous media. The fibers may be charged to improve the removal efficiency of the media. However, the fibers of the electret may present problems. The fibers may separate from the filter or project from the surface. This may cause damage to sensitive components within an enclosure.

Scrim layers may be useful to contain fibers, increase stiffness and improve filter handling. Known scrim layers include non-wovens, wovens, spun-bonds, knits, net like polymeric materials. Scrim layers may also be a source of fiber problems, as the scrim materials can themselves generate protruding fibers. Moreover, these known scrim materials may provide stiffness and some level of fiber containment, there still exists a need for a recirculation filter with a scrim layer capable of improved fiber containment without compromising its particle filtration performance within the drive. The improved recirculation filter of the present invention meets such a need.

SUMMARY

DETAILED DESCRIPTION

The recirculation filter of the present invention provides adequate particle filtration performance as well as fiber containment such that there are fibers of length greater than 1 mm are restricted from protruding from the surface of the filter. The recirculation filter may be installed within a protective enclosure by pressure fitting into slots or "C"-shaped channels. In certain applications the recirculating filter may be placed into the active air stream such as near the rotating disks in a computer hard disk drive or in front of a fan in electronic control cabinets, etc. In another embodiment, the recirculation filter can be incorporated in a plastic frame at its perimeter.

Figure 1:
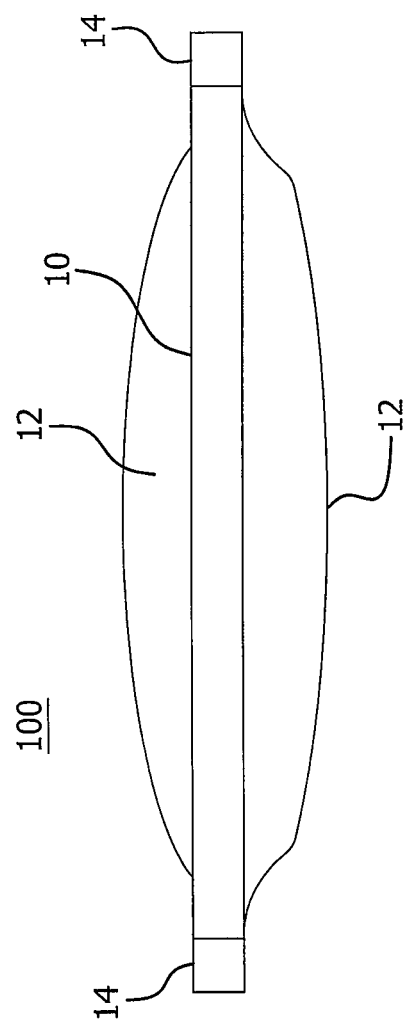
FIG. 1 describes a disk drive recirculation filter.

FIG. 1 depicts a typical disk-drive recirculation filter. The recirculation filter (100) comprises an electret material core (10) comprised of electret fibers. The electret fibers themselves may comprise a blend of dissimilar polymers, including, but not limited to a blend of polypropylene and acrylic fibers. The fibers may be charged during their manufacturing to improve filter performance. The term "electret" includes both electrostatic and triboelectric filtration media. The electret material may be constructed of electret fibers needled into a scrim. The electret materials may be specified by the weight per unit area of electret fibers needled into the scrim, and the weight of the scrim. Preferably, the electret fibers may be from about 23 grams per square meter to about 270 grams per square meter. A typical scrim weight for applications in recirculation filters is about 15 grams per square meter. The electret (10) may also comprise scrimless electret layers, for example, the electret core may comprise entangled electret fibers or spunbond electret fibers.

One or more scrim layers may be used on either side of electret core. The scrim layers may provide stiffness to the filter or improve filter handling. They may also contain some electret fibers protruding from the surface of the recirculation filter. Scrim layers may include wovens, non-wovens (including spun-bonded or point-bonded non-wovens), carded materials, knits and extruded nets. These constructions may be made from polymeric materials like polyethylene, polypropylene, polyester, polyamide, etc.

Figure 2:
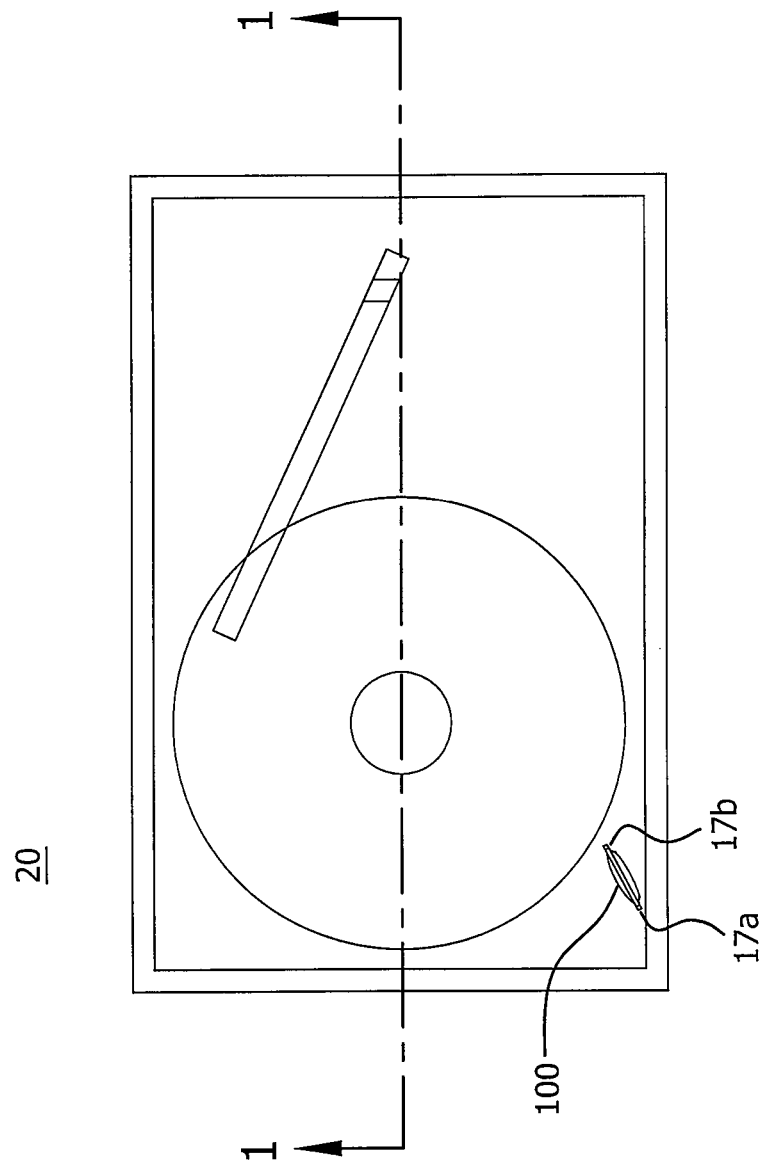
FIG. 2 shows the recirculation filter fitted within the C-channel of the drive.

The recirculation filter (100) is sealed at it's perimeter (14). To form the seal the electret core (10) and scrim layers (12) may be welded together using known techniques like laser welding, heat welding, or ultrasonic welding. The filters may be cut to size using known die-cutting methods. The recirculation filter may be fit inside a C-channel (17a, 17b) inside the protective enclosure such as a hard disk drive (20) as shown in FIG. 2.

Figure 3A:
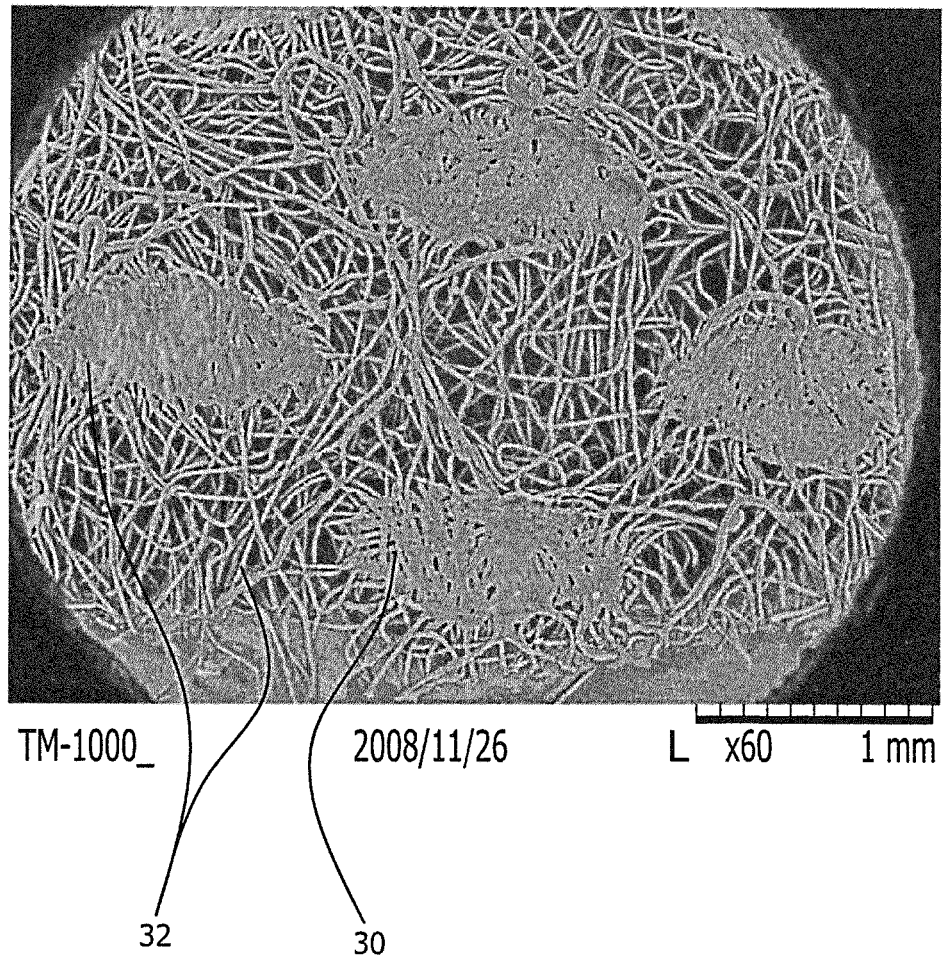
FIGS. 3a-3c are SEM images of the surface of scrims used in prior-art recirculation filters.
Figure 3B:
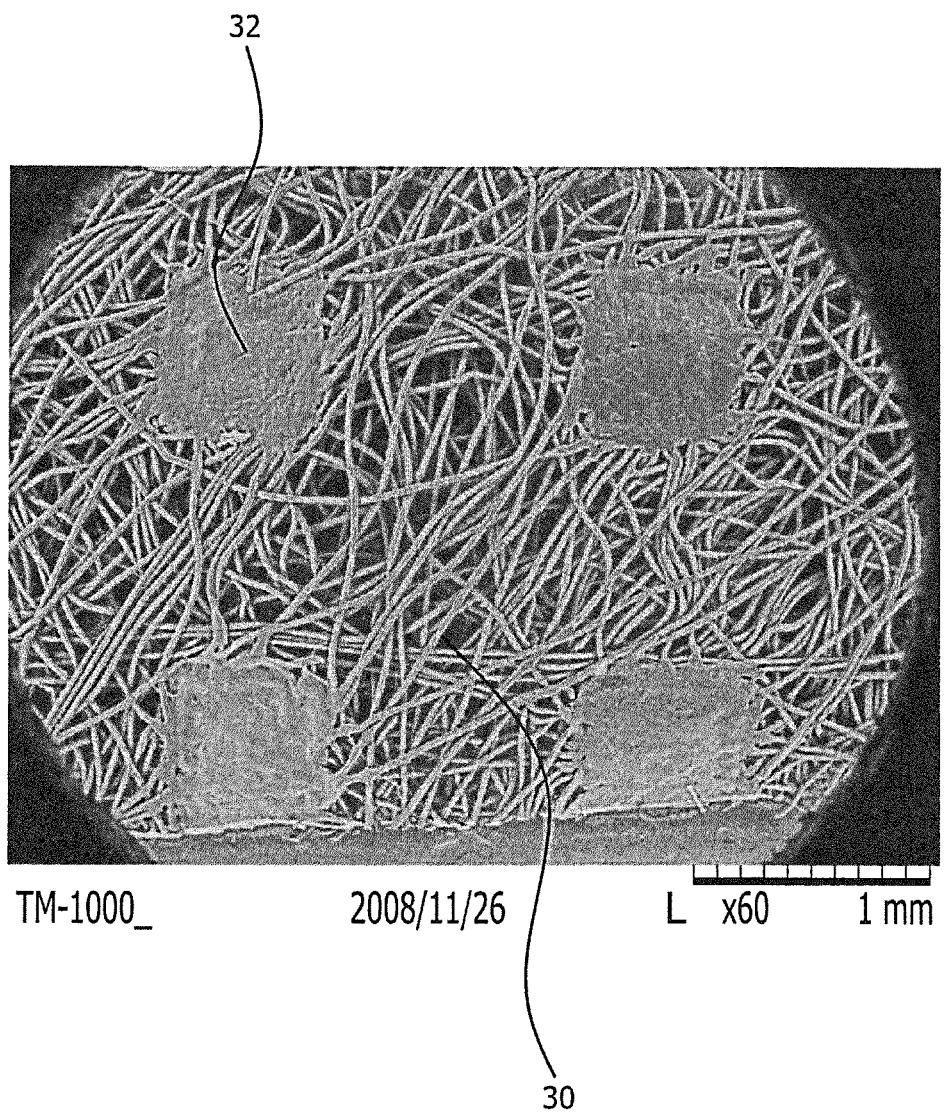
Figure 3C:
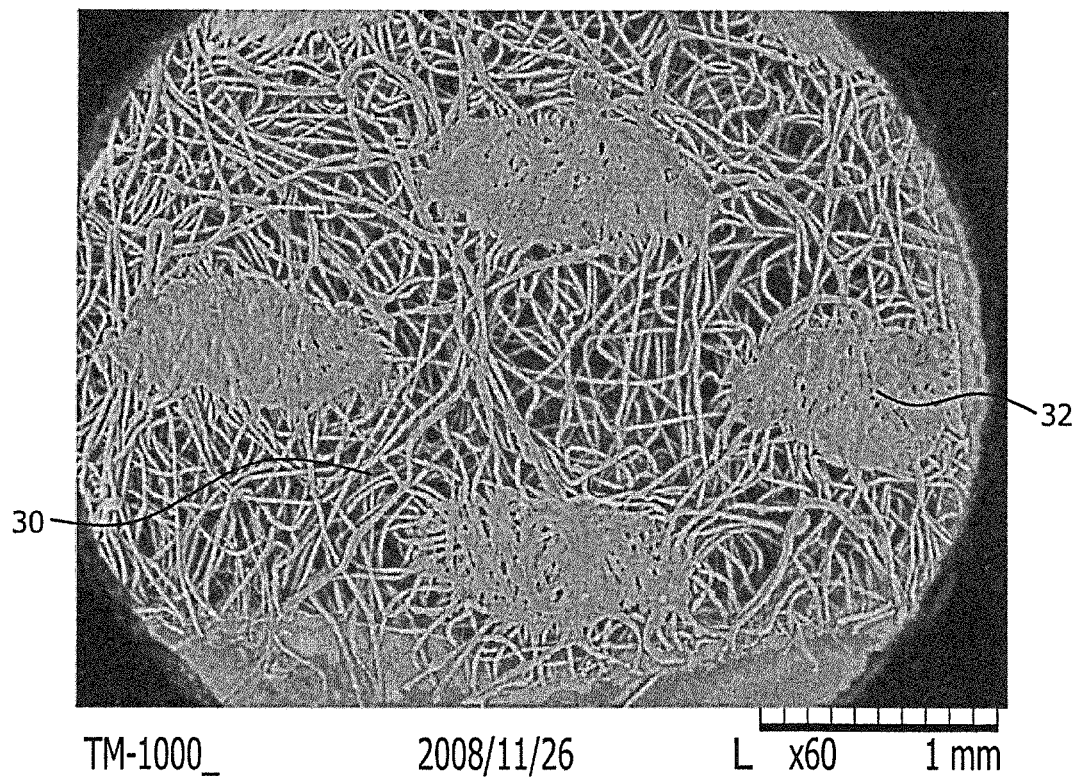

FIGS. 3a through 3c show SEM images of the surface of known scrim layers. The SEM images depict the surface of a point-bonded polymeric non-woven material, wherein the fibers (30) of the non-woven are bonded together in specific locations or points (32). These scrim layers are susceptible to loose fibers due to lack of sufficient point-bonding or the distance between bond points. Such scrim layers are unable to provide fiber containment that adequately inhibits fibers greater than 1 mm from protruding from the surface of the recirculation filter. Moreover, the distance or spacing between the point-bonds and the size of the point-bond may affect the permeability of the scrim layer. Accordingly an increase in the number of bonds, would cause an undesirable decrease in permeability.

Figure 4:
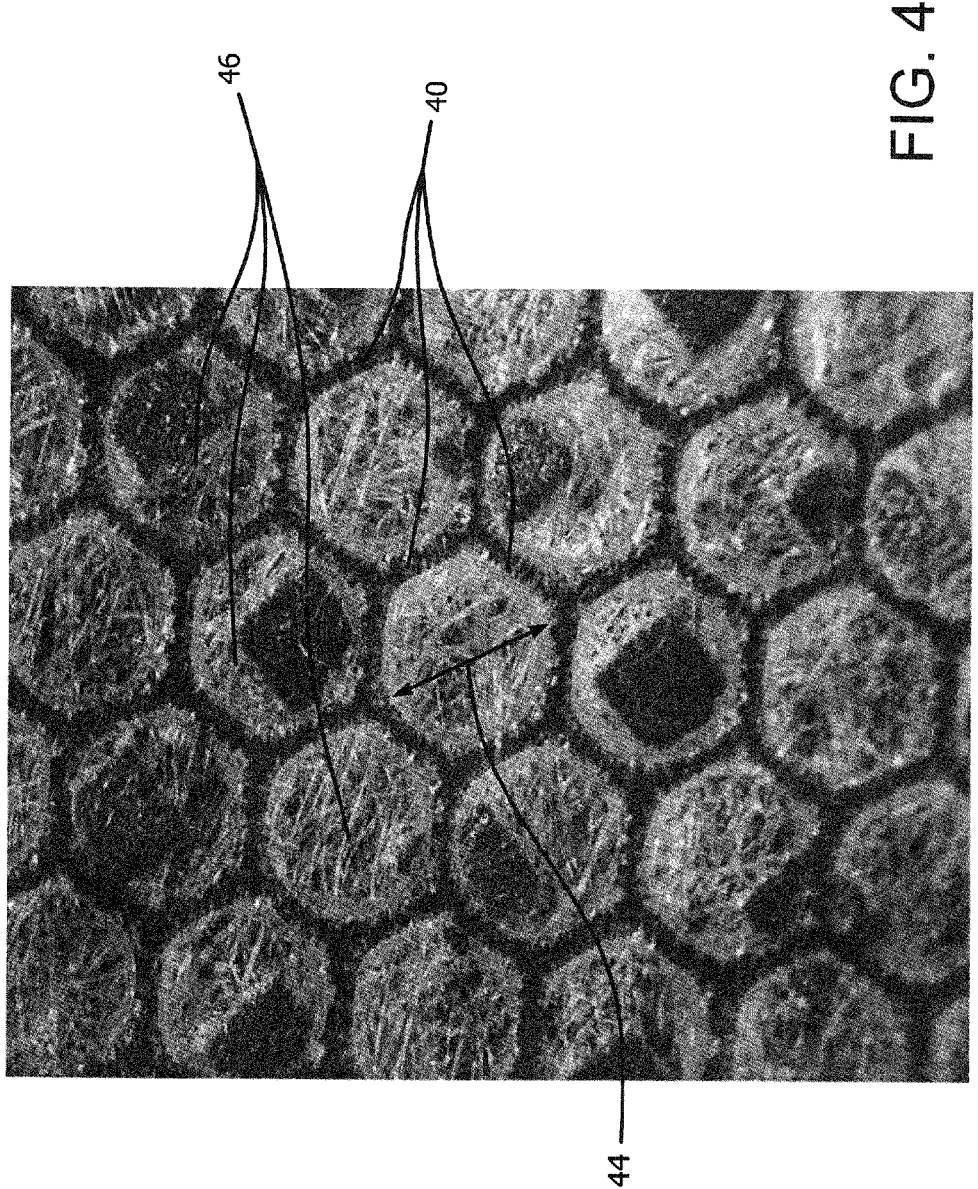
FIG. 4 is a microscopic image of the surface of the scrim layer of the present improved recirculation filter.

FIG. 4 shows a photograph image at 60× magnification of a scrim layer useful in the present invention. The structure shown in FIG. 4 provides fiber containment such that fibers greater than 1 mm are restricted from protruding from the surface of the recirculation filter. Fibers are restrained without compromising particle filtration performance. The image describes a point-bonded polypropylene non-woven scrim layer having a bond (40) through the thickness of the material. The bond defines a plurality of honey-comb shaped closed cells (46). The span (44) of the un-bonded area of the closed cell is about 1 mm.

It should be understood that the span may be controlled to a desired dimension depending on the critical fiber length that needs to be contained from the surface of the recirculation filter. The span may be designed to a dimension to inhibit fibers larger than a critical fiber length.

A critical fiber length may be the length of the fibers which, if not inhibited from projecting from the surface of the recirculation filter would cause undesirable results within the protective enclosure.

The bond through the thickness of the scrim layer, defining the plurality of shaped closed cells, may be created using several known techniques, including, heat sealing, ultrasonic welding, laser welding, etc.

The closed cells may be formed of any shape including, but not limited to honeycomb, circle, oval, square, rectangle, polygonal and even irregular random shapes, provided that the longest continuous span between bond sites does not exceed the critical fiber length. Closed cells of multiple shapes may also be formed on the same scrim layer.

The present invention will be further described with respect to the non-limiting examples provided below.

EXAMPLES

Fiber Length Inspection

Protruding fibers from a filter surface were inspected under 3× magnification under a Luxo lamp (8310 LFM101). A large sample size (5000 recirculation filters) was inspected for fibers greater than 1 mm protruding from the surface of the recirculation filter. The length was measured with reference to reference gauge.

Example 1

A scrim layer was constructed using a polypropylene spun bond, point-bonded non-woven scrim layer with a basis weight of about 25 g/m² as the starting material. A hexagonal pattern (as shown in FIG. 4) of closed cells with a maximum span of 1 mm was created by ultrasonically welding the scrim to form the hexagonal pattern on to it. The following welding conditions were used on an ultrasonic welder operating at 20 KHz, 96% amplitude and a force of 880 N to create the closed cell pattern.

One layer of electret material of basis weight 90 g/m², comprising a blend of polypropylene and acrylic fibers needled on to a polypropylene layer (basis weight of 15 g/m²) was placed between two such above scrim layers. These three layers were ultrasonically bonded to create a seal at the perimeter and then die-cut to provide a recirculation filter of the following dimensions: 21 mm length, 5.3 mm width, 1 mm seal width.

5000 such filters were constructed and all of them were inspected for fiber containment as described in the test method above. Out of the 5000 recirculation filters, only 2.3% of the filters had a fiber of length greater than or equal to 1 mm protruding from either surface (front and back) of the filter, thereby demonstrating the effectiveness of the scrim layer in providing fiber containment.

While the invention has been disclosed herein in connection with certain embodiments and detailed descriptions, it will be clear to one skilled in the art that modifications or variations of such detail can be made without deviating from the spirit of the invention, and such modifications or variations are considered to be within the scope of the claims herein.

The invention claimed is:

1. A recirculation filter comprising:
    a. a first polymeric support layer of support material comprising fibers and a second polymeric support layer of support material comprising fibers; and,
    b. a fibrous layer disposed between the first polymeric support layer and the second polymeric support layer, wherein said first and second polymeric support layers are located adjacent to said fibrous layer, and wherein each of said first polymeric support layer and said second polymeric support layer is bonded through the thickness of the layer to restrict protrusion of said fibers of said first and second polymeric support layers, the bonding being continuous to define a plurality of closed cells, such that the longest span of unbonded support material between bond sites is less than a critical fiber length of said fibers, said critical fiber length being a length of fibers which if not inhibited from protruding from a surface of the recirculation filter would cause undesirable results, and wherein the first and second polymeric support layers have a bond at the perimeter of the recirculation filter.

2. The recirculation filter of claim 1 in which the critical fiber length is about 1 mm.

3. The recirculation filter of claim 1 in which the first and second polymeric support layers comprise non-woven fibers.

4. A method of making a recirculation filter, the method comprising:
    a. providing a first polymeric support layer of support material wherein fibers of the first polymeric support layer are bonded through the thickness of the first polymeric support layer to restrict protrusion of said fibers, the bond being continuous to define a plurality of closed cells, such that the longest span of unbonded support material between bond sites is less than a critical fiber length, said critical fiber length being a length of fibers which if not inhibited from projecting from a surface of the recirculation filter would cause undesirable results,
    b. providing a second polymeric support layer of support material wherein fibers of the second polymeric support layer are bonded through the thickness of the second polymeric support layer to restrict protrusion of said fibers, the bond defining a plurality of cells, such that the longest span of unbounded support material between bond sites is less than the critical fiber length, said critical fiber length being a length of fibers which if not inhibited from projecting from a surface of the recirculation filter would cause undesirable results,
    c. providing a fibrous filter material between said first and second polymeric support layers, wherein said fibrous filter material is adjacent to said first and second polymeric support layers, and
    d. bonding said first polymeric support layer to said second polymeric support layer at the perimeter of the recirculation filter.

5. The recirculation filter of claim 1, wherein said plurality of closed cells of each of the first and second polymeric layers form a hexagonal pattern.

6. The recirculation filter of claim 1, wherein said fibrous layer comprises electret media.

7. The recirculation filter of claim 1, wherein said fibrous layer and said first and second polymeric support layers are welded together about the perimeter of the recirculation filter.

8. The recirculation filter of claim 1, and wherein the first and second polymeric support layers comprise non-woven fibers.

9. The recirculation filter of claim 8, wherein said fibrous layer comprises electret media.

10. The recirculation filter of claim 1, wherein each of said first polymeric support layer and second polymeric support layer are bonded, separate from said fibrous layer.

11. The method of claim 4, wherein said fibrous filter material is provided between said first and second polymeric support layers after said fibers of said first polymeric support layer are bonded through the thickness of the first polymeric support layer, and after fibers of said second polymeric support layer are bonded through the thickness of the second polymeric support layer.

12. The method of claim 4, wherein the critical fiber length is about 1 mm.

13. The method of claim 4, wherein the first and second polymeric support layers comprise non-woven fibers.

14. The method of claim 4, wherein said fibrous filter material is provided between said first and second polymeric support layers after said fibers of said first polymeric support layer are bonded through the thickness of the first polymeric support layer, and after fibers of said second polymeric support layer are bonded through the thickness of the second polymeric support layer.

\* \* \* \* \*